United States Patent
Sulser et al.

(10) Patent No.: US 10,040,722 B2
(45) Date of Patent: Aug. 7, 2018

(54) ADDITIVE FOR HYDRAULICALLY SETTING SYSTEMS WITH IMPROVED PROCESSING

(71) Applicant: SIKA TECHNOLOGY AG, Baar (CH)

(72) Inventors: Ueli Sulser, Unterengstringen (CH); Christina Hampel, Rütihof (CH); Jörg Zimmermann, Zürich (CH)

(73) Assignee: SIKA TECHNOLOGY AG, Baar (CH)

( * ) Notice: Subject to any disclaimer, the term of this patent is extended or adjusted under 35 U.S.C. 154(b) by 548 days.

(21) Appl. No.: 13/624,546

(22) Filed: Sep. 21, 2012

(65) Prior Publication Data

US 2013/0030087 A1    Jan. 31, 2013

Related U.S. Application Data

(63) Continuation of application No. PCT/EP2011/054209, filed on Mar. 21, 2011.

(30) Foreign Application Priority Data

Mar. 22, 2010 (EP) ..................... 10157203

(51) Int. Cl.
  C04B 28/02    (2006.01)
  C08G 81/02    (2006.01)
(52) U.S. Cl.
  CPC ............ C04B 28/02 (2013.01); C08G 81/025 (2013.01)
(58) Field of Classification Search
  USPC ...................................... 525/329.7
  See application file for complete search history.

(56) References Cited

U.S. PATENT DOCUMENTS

| | | | | |
|---|---|---|---|---|
| 5,728,207 A * | 3/1998 | Arfaei | ................. | C04B 24/2658 106/709 |
| 6,599,973 B1 * | 7/2003 | Visscher | ............... | C08F 265/04 524/413 |
| 8,569,410 B2 * | 10/2013 | Dupont | ................. | C08F 265/04 524/315 |
| 2008/0021169 A1 | 1/2008 | Sulser et al. | | |
| 2011/0245379 A1 * | 10/2011 | Sulser et al. | ...................... | 524/5 |

FOREIGN PATENT DOCUMENTS

| | | | |
|---|---|---|---|
| DE | 000010015135 | * 4/2001 | ............... C08F 8/03 |
| DE | 100 15 135 A1 | 10/2001 | |
| EP | 1 061 089 A1 | 12/2000 | |
| EP | 1 138 697 A1 | 10/2001 | |
| EP | 1 348 729 A1 | 10/2003 | |
| GB | 2 279 655 A | 1/1995 | |
| JP | 7-81995 A | 3/1995 | |
| JP | 11-217255 A | 8/1999 | |
| WO | WO 95/09821 A2 | 4/1995 | |
| WO | WO 97/35814 A1 | 10/1997 | |
| WO | WO 2005/090416 | 9/2005 | |
| WO | WO2008149226 | * 11/2008 | ............ C08F 220/32 |

OTHER PUBLICATIONS

*International Search Report (PCT/ISA/210) dated Apr. 21, 2011, by the European Patent Office as the International Searching Authority for International Application No. PCT/EP2011/054209.
*Written Opinion (PCT/ISA/237) dated Apr. 21, 2011, by the European Patent Office as the International Searching Authority for International Application No. PCT/EP2011/054209.
Notification of Transmittal of Translation of the International Preliminary Report on Patentability (Forms PCT/IB/338 and PCT/IB/373) and the Written Opinion of the International Searching Authority (Form PCT/ISA/237) dated Oct. 4, 2012, issued in corresponding International Application No. PCT/EP2011/054209. (7 pages).
Office Action (Communication pursuant to Article 94(3) EPU) dated Mar. 13, 2018, by the European Patent Office in corresponding European Patent Application No. 11 710 728.4-1101. (4 pages).

* cited by examiner

Primary Examiner — Ling Siu Choi
Assistant Examiner — Thuy-Ai N Nguyen
(74) Attorney, Agent, or Firm — Buchanan Ingersoll & Rooney PC

(57) ABSTRACT

A comb polymer and use thereof for improving the processing of hydraulically setting compositions. The comb polymer has ester, amide and/or ether groups on side chains bound to a main chain and the main chain has at least one acrylic acid unit A or a salt thereof and at least one methacrylic acid unit M or a salt thereof. Processes for producing a hydraulically setting composition with longer processing time.

34 Claims, No Drawings

ADDITIVE FOR HYDRAULICALLY SETTING SYSTEMS WITH IMPROVED PROCESSING

RELATED APPLICATION(S)

This application claims priority as a continuation application under 35 U.S.C. § 120 to PCT/EP2011/054209, which was filed as an International Application on Mar. 21, 2011 designating the U.S., and which claims priority to European Application No. 10157203.0 filed in Europe on Mar. 22, 2010. The entire contents of these applications are hereby incorporated by reference in their entireties.

FIELD

Disclosed are additives for hydraulically setting systems, for example, dispersing agents for concrete compositions.

BACKGROUND INFORMATION

Polymers that contain α,β-unsaturated carboxylic acids with polyoxyalkylene side chains have been used in concrete technology as dispersing agents, for example, as plasticizers. The addition of such polymers to cements allows to reduce the water content, which can be desirable for the processing and stability of the concrete. These polymers have a comb polymer structure. There is a series of such comb polymers which, besides ester and carboxylic acid groups, also have amide groups. Two processes can be used for producing generic comb polymers. In one process, such comb polymers are prepared from unsaturated carboxylic acid, ester, ether, amide, and/or imide-functional monomers by free-radical polymerizations. In another process, the polymers are prepared in a so-called polymer-analogous reaction from a polycarboxylic acid comprising at least one acrylic acid unit or at least one methacrylic acid unit and the respective alcohols and/or amines. In this process, the comb polymer is obtained by an esterification and/or amidation of the polycarboxylic acid or a salt or an anhydride thereof.

Despite the improvement regarding plastification, it can still be a challenge to adapt to the various processing conditions globally used in the manufacturing of concrete. This is due to the various types of local climate, cements, aggregates, cement replacement fillers, etc., and the broad field of use, such as ready-mix concrete, air-placed concrete, self-compacting concrete or concrete mixed on site. Therefore, it can be beneficial to provide special additives meeting completely different specifications.

It can be beneficial to provide new additives which can be used as dispersants, for example, as plasticizers for hydraulically setting systems and, for example, for new fields of use.

In comparative plasticizers based on comb polymers, the processing is good in the beginning due to the very strong water reduction. However, this subsequently quickly deteriorates, which results in poor processing of the hydraulically setting composition within a short time.

SUMMARY

According to an exemplary aspect, a comb polymer for improving the processing of a hydraulically setting composition is disclosed, comprising: side chains bound to a main chain via ester, amide and/or ether groups, wherein the main chain includes at least one acrylic acid unit A or a salt thereof and at least one methacrylic acid unit M or a salt thereof, wherein the comb polymer is prepared by an esterification and/or amidation of a polycarboxylic acid or a salt or an anhydride thereof.

According to an exemplary aspect, a method for producing a hydraulically setting composition is disclosed, the method comprising: mixing a hydraulically setting binder, water, and the comb polymer according to an exemplary aspect.

According to an exemplary aspect, a method of using a comb polymer is provided, the method comprising: adding at least a portion of the comb polymer according to an exemplary aspect that is employed in the method, to at least one component of a hydraulically setting composition before and/or during a grinding process.

According to an exemplary aspect, a method of using a comb polymer is provided, the method comprising: conducting a grinding process using the comb polymer according to an exemplary aspect as a grinding aid for improving grinding efficiency.

According to an exemplary aspect, a method of using a comb polymer is provided, the method comprising: adding an entire amount of the comb polymer according to an exemplary aspect that is employed in the method, to at least one component of a hydraulically setting composition before and/or during a grinding process.

DETAILED DESCRIPTION

According to an exemplary aspect, new plasticizers for use in settable compositions having special and desirable properties are provided. The polymers can provide a sufficient plasticizing effect in hydraulically setting compositions. For example, polymers with good long-term processing can be provided.

According to an exemplary aspect, disclosed is the use of a comb polymer for improving the processing of hydraulically setting compositions, wherein the comb polymer has side chains bound to a main chain via ester, amide and/or ether groups and the main chain has at least one acrylic acid unit A or a salt thereof and at least one methacrylic acid unit M or a salt thereof, wherein the comb polymer has been prepared by an esterification and/or amidation of a polycarboxylic acid or a salt or an anhydride thereof.

The comb polymer can have from 5 to 95 mol %, for example, from 5 to 50 mol % of acrylic acid units A, from 5 to 95 mol %, for example, from 5 to 50 mol % of methacrylic acid units M and from 5 to 50% by weight of monomers having side chains bound to the main chain via ester, amide and/or ether groups, based in each case on the total number of all monomer units in the main chain of the comb polymer.

In an exemplary embodiment, the comb polymer comprises:
a) at least one acrylic acid unit A or a salt thereof;
b) at least one methacrylic acid unit M or a salt thereof; and
c) at least one structural unit B of the formula (I);

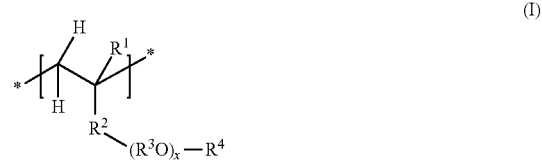

wherein

R$^1$, independently of one another, is H or CH$_3$;

R$^2$, independently of one another, is an ester group —CO—O— or an amide group —CO—NH—;

R$^3$, independently of one another, is a C$_2$-C$_6$ alkylene group, for example, an ethylene or propylene group, R$^4$, independently of one another, is H, a C$_1$-C$_{12}$ alkyl or cycloalkyl moiety, a C$_7$-C$_{20}$ alkylaryl or aralkyl moiety or a substituted or unsubstituted aryl moiety or a univalent organic moiety having from 1 to 30C atoms which optionally has hetero atoms, and x, independently of one another, is a value between 3 and 250, for example, between 5 and 150, wherein the main chain of the comb polymer is a linear copolymer obtained from at least one acrylic acid unit A or the salt or anhydride thereof and the methacrylic acid unit M or the salt or anhydride thereof by polymerization, wherein the structural unit B is a component of this linear copolymer.

The at least one acrylic acid unit A and the at least one methacrylic acid unit M can be partially or completely neutralized. The acid unit can be provided as a free acid or also as a salt or partial salt or anhydride, wherein the term "salt" here and hereinafter also comprises, in addition to the classic salts obtained by neutralization with a base, complex chemical compounds of metal ions and the carboxylate or carboxyl groups as ligands. The classic salts can be obtained, for example, by a neutralization with sodium hydroxide, calcium hydroxide, magnesium hydroxide, ammonium hydroxide or an amine.

Depending on the selection of moiety R$^2$, the structural unit B of formula (I) can be an ester or an amide. A comb polymer may comprise both esters and amides.

In an exemplary embodiment, the comb polymer comprises at least one structural unit B of the formula (I) with R$^1$ equal to H and at least one structural unit B of the formula (I) with R$^1$ equal to CH$_3$, wherein R$^2$ can be an ester group. This means that in an exemplary comb polymer, a portion of the structural units B is polyoxyalkylene acrylate units and another portion of the structural units B is polyoxyalkylene methacrylate units.

In an exemplary embodiment, —(R$^3$O)$_x$— represents a C$_2$ to C$_4$ polyoxyalkylene group, for example, a polyoxyethylene group or a polyoxypropylene group or mixtures of oxyethylene and oxypropylene units in any sequence, for example, random, alternating, or block-wise.

In an exemplary embodiment, R$^4$ is not H. In an exemplary embodiment, R$^4$ is a methyl moiety.

In an exemplary embodiment, the comb polymer has a proportion of ethylene oxide units of at least 30 mol %, for example, from 50 to 100 mol %, for example, from 80 to 100 mol % of the total number of all (R$^3$O)$_x$ units. In an exemplary embodiment, the comb polymer comprises only ethylene oxide units.

In an exemplary embodiment, the comb polymer comprises at least one additional structural unit C which differs from the structural units A, B, and M and which is selected from an ether, ester, amide, or imide unit, an acid unit selected from carboxylic acid, sulfonic acid, phosphonic acid, phosphoric acid ester, carbonylamidomethylpropanesulfonic acid and salts thereof, or a polyoxyalkyleneoxycarbonyl, polyoxyalkyleneaminocarbonyl, polyoxyalkyleneoxyalkyl, polyoxyalkyleneoxy, hydroxyethyloxycarbonyl, acetoxy, phenyl, or N-pyrrolidonyl group. For example, the additional structural unit C comprises polyoxyalkylene groups, for example, polyoxyethylene groups, polyoxypropylene groups or mixtures thereof. For example, the structural unit C can be an ester unit prepared by reacting a mono- or dicarboxylic acid with an alkyl alcohol, for example, a C$_6$-C$_{20}$ alkyl alcohol.

The comb polymer may comprise a combination of different structural units of the respective structural units of A, M, B, and optionally C. For example, mixtures of several acid units A and M that are not or completely neutralized may exist in the comb polymer. Alternatively, mixtures of several different ester and/or amide units B may exist in the comb polymer, such as, for example, several ester units B with different substituents R$^3$. For example, the combined use of polyoxyalkylenes, for example, of polyoxyethylene and polyoxypropylene, or the combined use of polyoxyalkylenes having different molecular weights, for example, of polyoxyethylene, is exemplary.

In an exemplary embodiment, the comb polymer comprises:

a) from 5 to 95 mol %, for example, from 10 to 80 mol %, for example, from 20 to 60 mol % of acrylic acid units A, b) from 5 to 95 mol %, for example, from 10 to 80 mol %, for example, from 20 to 60 mol % of methacrylic acid units M, c) from 5 to 50 mol %, for example, from 10 to 40 mol % of the structural unit B, and d) from 0 to 30 mol %, for example, from 0 to 15 mol %, for example, from 0 to 5 mol % of the structural unit C, based in each case on the total number of all monomer units in the main chain of the comb polymer.

In another exemplary embodiment, the comb polymer comprises:

a) from 30 to 70 mol %, for example, from 40 to 60 mol % of acrylic acid units A, b) from 30 to 70 mol %, for example, from 40 to 60 mol % of methacrylic acid units M, c) from 5 to 50 mol %, for example, from 10 to 40 mol % of the structural unit B, and d) from 0 to 30 mol %, for example, from 0 to 15 mol %, for example, from 0 to 5 mol % of the structural unit C, based in each case on the total number of all monomer units in the main chain of the comb polymer.

The sequence of the individual structural units A, M, B, and C in the comb polymer may be random, alternating or block-wise.

The comb polymer can have an average molecular weight M$_n$ ranging from 1000 to 100,000 g/mol, for example, from 2000 to 70,000 g/mol, for example, from 5000 to 50,000 g/mol.

According to an exemplary aspect, the comb polymers can be prepared by a polymer-analogous reaction. The polymer-analogous reaction can be desirable in that comb polymers having very different and desirable structures and properties can be obtained by varying the amount, type and ratio of alcohols and amines. Surprisingly, it has been found that the exemplary use of comb polymers prepared by a polymer-analogous reaction can provide desirable properties which ensure, for example, the processing of cement compositions over longer periods. While not wishing to be bound by any particular theory, it is believed that the different distributions of side chains within the polymer are most likely responsible for the different properties.

In an exemplary embodiment of the disclosure, the esterification and/or amidation proceeds by the reaction of a) at least one polycarboxylic acid comprising at least one acrylic acid unit A and at least one methacrylic acid unit M, or a salt or anhydride of this polycarboxylic acid; and b) at least one compound selected from the group consisting of a monohydroxy compound E of the formula (II)

HO—(R³O)ₓ—R⁴ (II)

and a monoamine compound F of the formula (III)

NH₂—(R³O)ₓ—R⁴ (III)

wherein R³, R⁴, and x are selected independently of one another as mentioned above.

Polymer-analogous reactions as such are described, for example, in WO 97/35814 A1, WO 95/09821 A2, DE 100 15 135 A1, EP 1138697 A1, EP 1348729 A1, and WO 2005/090416 A1. Details of the polymer-analogous reaction have been disclosed, for example, in EP 1 138 697 B1 from page 7, line 20, to page 8, line 50, and the examples or in EP 1 061 089 B1 from page 4, line 54 to page 5, line 38 and the examples. As described in EP 1 348 729 A1 from page 3 to page 5 and in the examples, the comb polymer can also be obtained in the solid state.

For example, a comb polymer which can be obtained by reacting (a) at least one polycarboxylic acid comprising at least one acrylic acid unit A and at least one methacrylic acid unit M, or a salt or anhydride of this polycarboxylic acid; and (b) at least one monohydroxy compound E and at least one monoamine compound F comprising at least one polyoxyalkylene group and optionally (c) at least one additional compound D can be used.

A "polycarboxylic acid comprising at least one acrylic acid unit A and at least one methacrylic acid unit M" can include a copolymer which can be obtained by polymerizing acrylic acid and methacrylic acid or the salts or thereof.

The polycarboxylic acid can exist in the form of a free acid or a salt. However, for example, only a portion of the acid groups can exist in the form of a salt. The term "salt" comprises, in addition to the classic salts obtained by neutralization with a base, also complex chemical compounds of metal ions and the carboxylate groups as ligands.

The copolymer of acrylic and methacrylic acids can be obtained by a free-radical polymerization according to any suitable method. It can be performed in a solvent, for example, in water. This free-radical polymerization can be performed in the presence of at least one molecular weight modifier, for example, an inorganic or organic sulfur compound such as mercaptans, for example, or a phosphorous compound. The copolymer of the acrylic and methacrylic acids can have a molecular weight $M_W$ from 500 to 20,000 g/mol, for example, from 2,000 to 15,000 g/mol, for example, from 3,500 to 10,000 g/mol.

The monohydroxy compound E can be terminated on one side with end groups which are not reactive under usual reaction conditions. For example, it is a polymer with a polyalkylene glycol backbone. The monohydroxy compound E has the formula (II)

HO—(R³O)ₓ—R⁴ (II)

wherein R³, independently of one another, is a $C_2$-$C_4$ alkylene group with an order of the (R³O) units in any possible sequence; wherein R⁴' represents a $C_1$-$C_{12}$ alkyl or cycloalkyl moiety, a $C_7$-$C_{20}$ alkylaryl or aralkyl moiety or a substituted or unsubstituted aryl moiety or a univalent organic moiety having from 1 to 30C atoms which optionally has hetero atoms; and wherein y, independently of one another, is from 3 to 250, for example, from 5 to 150.

Monohydroxy compounds E of the formula (II) having a methyl, ethyl, i-propyl or n-butyl group, for example, a methyl group as substituent R⁴', are exemplary. For example, R³, independently of one another, represents a $C_2$ alkylene group and/or a $C_3$ alkylene group. For example, E are mixed polymers of ethylene oxide/propylene oxide, for example, a polyoxyethylene terminated with an end group on one side. Mixtures of several different compounds of the group E are possible as well. Hence, for example, polyoxyethylenes terminated with end groups on one side and different molecular weights can be mixed, or, for example, mixtures of polyoxyethylenes terminated with end groups on one side and mixed polymers of ethylene oxide and propylene oxide or polyoxypropylenes terminated with end groups on one side can be used.

In an exemplary embodiment, the monohydroxy compound E is a polyoxyalkylene terminated with an end group on one side with a molecular weight $M_W$ from 500 to 10,000 g/mol, for example, from 800 to 8000 g/mol, for example, from 1000 to 6000 g/mol. A mixture of polyoxyalkylenes terminated with end groups on one side and different molecular weights, for example, the mixture of a polyoxyalkylene with a molecular weight 1,000 g/mol and a polyoxyalkylene with a molecular weight of 5,000 g/mol is suited as well.

In addition to the monohydroxy compound E, a monoamine compound F can also be used. This can result in the formation of amide groups. Examples of such monoamine compounds F can be represented by formula (III):

NH₂—(R³O)ₓ—R⁴ (III)

The substituents R³ and R⁴ and the index x, independently of one another, have the same meanings as defined above for formula (I).

Examples of such monoamine compounds F can include α-methoxy-ω-aminopolyoxyethylene, α-methoxy-ω-aminopolyoxypropylene, and α-methoxy-ω-aminooxyethylenesoxypropylene copolymer. Exemplary monoamine compounds F are α-methoxy-ω-aminooxyethylene-oxypropylene copolymers or α-methoxy-ω-aminopolyoxyethylenes and other monoamines, such as are commercially available, for example, under the name M Series Jeffamine® from Huntsman, and mixtures thereof. α-methoxy-ω-aminooxyethylene-oxypropylene copolymers are exemplary. For example, such monoamine compounds F can be obtained by polymerization of ethylene oxide and/or propylene oxide started with an alcohol followed by the conversion of the terminal alcohol group to an amino group.

A compound which is reactive towards the polycarboxylic acid or the salt or anhydride thereof is another exemplary compound D. Examples for a compound D are further amines or alcohols, for example, a $C_6$-$C_{20}$ alkyl alcohol or another mono- or diamine, for example, a monoamine. Several different compounds D can also be used.

In the polymer-analogous reaction, the reaction of the polycarboxylic acid or the salt or anhydride thereof and at least one monohydroxy compound E and/or at least one monoamine compound F and optionally a compound D to yield a comb polymer can be performed by adding at least one monohydroxy compound E and/or at least one monoamine compound F to the polycarboxylic acid or the salt or anhydride thereof by stirring and heating to the reaction temperature. Stirring of the mixture is continued and the reaction is optionally supported by applying a vacuum or passing a flow of gas over or through the reaction mass. The temperature of this reaction can be between 140° C. and 200° C., for example. However, the reaction can also be performed at temperatures between 150° C. and 175° C. If a monoamine compound F is used in addition to the monohydroxy compound E, it can be added concurrently with the monohydroxy compound E or later in this reaction step.

In an exemplary embodiment, this reaction can be performed in the presence of an esterification catalyst. The removal of water from the reaction mixture can be performed under atmospheric pressure, but also under vacuum. In addition, a flow of gas can be passed over or through the reaction mixture. Air or nitrogen can be used as the flow of gas. The reaction can be monitored by measuring the acid value, for example, titrimetrically, and stopped at a desired acid value. The reaction can also be stopped by removing the vacuum and cooling.

In an exemplary embodiment, a copolymer obtained by polymerizing acrylic acid and methacrylic acid is esterified with a polyoxyethylene which is terminated with a methyl group on one side and optionally reacted with a monoamine.

In the polymer-analogous reaction, in addition to ester groups and optionally amide groups, anhydride groups can also be formed which, in a second step, can be reacted completely or partially with an amine compound to yield an amide. Such processes have been described in WO 2005/090416 A1, for example.

The use of a comb polymer prepared by a polymer-analogous esterification with a hydraulically setting mortar can result in a prolonged dispersing effect which, in turn, can allow to obtain an improved processing. Surprisingly, this dispersing effect can be more efficient and prolonged than that obtained by using a comb polymer having the same molecular weight and the same stoichiometric composition which has been prepared by a free-radical copolymerization of acrylic and methacrylic acids and the esters thereof.

In an exemplary embodiment, the polymer is not obtained by a free-radical polymerization where the copolymer is prepared from corresponding ethylenically unsaturated acid, ester, and amide monomers in the presence of a radical former. The route via free-radical polymerization is a method used, for example, in a comparative embodiment.

The term "hydraulically setting composition" can include compositions which contain hydraulically setting binders. Such binders set in the presence of water. Any suitable compositions and binders, for example, employed in the art of construction chemistry, can be used. In an exemplary embodiment, the hydraulic binder can be selected from the group consisting of cement, plaster, for example in the form of anhydrite or burnt gypsum, caustic lime and mixtures of cement with fly ash, silica fume, slag, slag sand, or limestone filler.

Cements include Portland cements or aluminous cements and any respective mixture thereof with the usual additives, for example. Cement is an exemplary hydraulically setting composition.

The hydraulically setting compositions can contain usual additives such as fly ashes, silica fume, slag, slag sands, or limestone fillers. Moreover, aggregates such as sand, gravel, stones, quartz powder, chalks and components usually used as additives such as other concrete plasticizers, for example, lignosulfonates, sulfonated naphthalene-formaldehyde condensates, sulfonated melamine-formaldehyde condensates, or polycarboxylate ethers, accelerators, corrosion inhibitors, retarders, shrinkage reducers, defoamers, or air-entraining agents are possible.

The comb polymer can be used as a dispersants or dispersant component. The dispersant comprises at least one comb polymer. The dispersant may contain additional components. Examples of additional components are additives such as other plasticizers, for example, lignosulfonates, sulfonated naphthalene-formaldehyde condensates, sulfonated melamine-formaldehyde condensates, or polycarboxylate ethers (PCE), accelerators, retarders, shrinkage reducers, defoamers, air-entraining agents, or foaming agents. For example, the proportion of the comb polymer can be from 5 to 100% by weight, for example, from 10 to 100% by weight, based on the total weight of the dispersant.

Depending on the reaction route, the dispersant may contain free compounds of the starting materials, for example, free monohydroxy compounds such as, for example, a polyoxyalkylene terminated with an end group on one side, for example, free methoxypolyoxyethylene, in addition to the comb polymer.

The dispersant can, for example, be used as a plasticizer, as a water reducer, to improve the workability and/or to improve the flowability of the hydraulically setting compositions manufactured using it. For example, the dispersant can be used for manufacturing hydraulically setting compositions with longer processing time.

In an exemplary use, the hydraulically setting compositions can provide a prolonged processing time. This means that the composition can remain processable for a comparatively long time compared to compositions which do not contain the comb polymer or compared to compositions which contain other water reducing additives such as comparative plasticizers. For example, the comparison is made by initially providing the compositions which do not contain the comb polymer or which contain a comparative plasticizer with the same water/cement ratio (W/C ratio) and a comparable initial slump-flow value which is adjusted by the dosing quantity of the comparative plasticizer. In an exemplary embodiment, the slump-flow value of hydraulically setting compositions containing the comb polymer does not decrease or only slightly decreases after a preset time, for example, after 60 min or after 90 min, such that the change between the initial slump-flow value and the slump-flow value after one hour, for example, even after 90 minutes, is as small as possible.

For example, the long-term processing can be improved in an exemplary use. The long-term processing can be determined by the slump-flow value according to EN 1015-3. For example, the processing after more than 30 min, after more than 60 min and/or after more than 90 min can be improved, respectively, after adding the water. For example, the processing at the time of 30 min, 60 min and/or 90 min is improved, respectively, after adding the water. In an exemplary embodiment, the slump-flow value of the hydraulically setting composition measured according to EN 1015-3 can decrease by less than 20% or less than 15%, for example, by less than 10% or less than 5% after 60 minutes and/or after 90 minutes. In an exemplary embodiment, the slump-flow value can decrease by less than 10% after 90 min.

The disclosure can also provide a process for producing a hydraulically setting composition with longer processing time, wherein a hydraulically setting binder, water, and an exemplary comb polymer are mixed.

The comb polymer can used in an amount from 0.01 to 5% by weight, for example, from 0.05 to 2% by weight or from 0.1 to 1% by weight, based on the weight of the binder. The comb polymer can be added separately or premixed as a dispersant in solid or liquid form. For example, the dispersant is used in liquid form, for example, as an aqueous solution.

The comb polymer or the dispersant can also be used in the solid form, for example, as powders, scales, pellets, granulates, or plates. Such solid additives can be transported and stored easily. The comb polymer may, in the solid state, also be part of a so-called dry mix, which is storable over a prolonged period and can be packaged into bags or stored in silos and used. Such dry mix can be used even after prolonged storage and has good flowability.

The comb polymer can be added to a hydraulically setting composition with or shortly before or shortly after the addition of the water. It can be suitable here to add the comb polymer in the form of an aqueous solution or dispersion, for example, as mixing water or as part of the mixing water. The aqueous solution or dispersion can be prepared, for example, by adding water when manufacturing the comb polymer or by subsequent mixing with water. Depending on the comb polymer type, a dispersion or a solution can be formed, with a uniform solution being exemplary.

The comb polymer can also be added to a hydraulically setting composition before or during the grinding of the composition, for example, the grinding of cement clinker to produce cement.

According to an exemplary embodiment, at least a portion of the comb polymer is added to at least one component of the hydraulically setting composition before and/or during a grinding process. In an exemplary embodiment, all of the comb polymer is added before and/or during the grinding process.

Independently of an improvement of the processing of hydraulically setting compositions, an exemplary comb polymer can also be used as a grinding aid, for example, for improving the grinding efficiency, in a grinding process. In this process, the comb polymers can be capable of improving the efficiency of the grinding process. The comb polymer can be used both for improving the processing of hydraulically setting compositions and at the same time as a grinding aid.

The grinding process can include, for example, the grinding of cement raw materials, cement clinker, cement and/or cement additives. Cement additives can be slag sands, pozzolans, fly ashes, and/or limestone.

For example, the grinding process can be performed in the form of a wet, a semi-wet, or a dry grinding process. Contrary to the dry grinding process, in the wet and the semi-wet grinding processes the material to be ground is mixed and ground in the wet state. For example, the grinding process can be performed in the form of a dry grinding process.

EXAMPLES

1. Terms and Designations
   AS: Acrylic acid
   EO: Ethylene oxide
   RP: Reaction by free-radical polymerization of the monomer polyalkylene glycol esters of acryl or methacrylic acid
   Jeff 2070: Methylpolyalkylene glycolamine with a molar EO/PO ratio of 31/10
   MPEG 1000: Polyethyleneglycol monomethyl ether with a molecular weight of 1000 g/mol
   MPEG 3000 Polyethyleneglycol monomethyl ether having a molecular weight of 3000 g/mol
   M-1: Mortar mixture 1
   MAS: Methacrylic acid
   Mw: Weight average molecular weight of the polymer molecule
   Mn: Number average molecular weight of the polymer molecule
   P-1: Polymer 1 according to the disclosure
   PA: Polymer-analogous reaction of PAS or PMAS.
   PAS: Polyacrylic acid
   PMAS: Polymethacrylic acid
   PO: Propyleneoxide
   V-1: Comparative Example 1
   VM-1: Comparative mortar mixture 1

2. Molecular Weight Determination

The molecular weights were determined by gel permeation chromatography (GPC) using aqueous eluents. A narrowly calibrated Na polyacrylate standard served as calibration. A 0.1 molar NaNO3 with a pH=12 was used as eluent. Flow 0.8 ml/min, isocratic.

GPC columns: Varian Ultrahydrogel 7.8×300 mm: the peaks were quantified using a Varian RI-4 differential refractometer and a Waters SAT/IN Module UV detector.

3. Preparation of Polymers

Table 1 summarizes exemplary parameters of the exemplary polymers and the comparative polymers.

TABLE 1

Overview of the polymer preparation

| Polymer | AS mol | MAS mol | MPEG-1000 (mol) | MPEG-3000 (mol) | Jeff 2070 g | Reaction | Modifier * g | Mn |
|---|---|---|---|---|---|---|---|---|
| P-1 | 0.5 | 0.5 | 0.27 | | | PA | 4 | 11000 |
| P-2 | 0.5 | 0.5 | 0.20 | 0.073 | 2.5 | PA | 4 | 10500 |
| P-3 | 0.6 | 0.4 | 0.14 | 0.093 | 2.5 | PA | 4 | 10700 |
| P-4 | 0.6 | 0.4 | 0.20 | 0.073 | 2.5 | PA | 4 | 10100 |
| P-5 | 0.4 | 0.6 | 0.27 | | 2.5 | PA | 4 | 10100 |
| P-6 | 0.4 | 0.6 | 0.20 | 0.073 | 2.5 | PA | 4 | 11000 |
| P-7 | 0.5 | 0.5 | 0.34 | | 2.5 | PA | 4 | 11300 |
| V-1 | 1.0 | | 0.34 | | 2.5 | PA | 4 | 10900 |
| V-2 | | 1.0 | 0.34 | | 2.5 | PA | 9 | 11200 |
| V-3 | | | 1:1 mixture of V-1/V-2 | | | | | |
| V-4 | 0.5 | 0.5 | 0.27 | | 2.5 | RP | 4 | 10200 |
| V-5 | 0.5 | 0.5 | 0.20 | 0.073 | 2.5 | RP | 4 | 10700 |
| V-6 | Sulfonated naphthalene-formaldehyde condensate | | | | | | | |

* Na hypophosphite monohydrate 3.1. Preparation of Approximately 50% Aqueous Polycarboxylic Acids Polycarboxylic Acid 1: Polyacrylic Acid Formulation 1:

| Receiving flask: | 300 g of dist. water |
|---|---|
| Feed 1 | 720 g (10 mol) of acrylic acid<br>227 g of dist. water |
| Feed 2: | 40 g of sodium hypophosphite monohydrate (4 g/mol AS)<br>115 g of dist. water |
| Feed 3: | 20 g of sodium peroxodisulfate (2 g/mol AS)<br>115 g of dist. water |

In a 3-liter, four-necked round-bottom flask provided with a thermometer, an anchor stirrer with a coolable stirrer seal, a 40 cm ball condenser, and a coolable inlet tube for feeds from automatic dosing devices, 300 g of water was heated to reflux. Then, 13.6 ml of the Na hypophosphite solution (inlet 2) was quickly added and 13.6 ml (inlet 3) was quickly added. Then, while boiling and stirring, feed 1 was added with a dosing rate of 6 ml/min during 180 minutes. At the same time, feed 2 (dosing rate 0.8 ml/min) and feed 3 (dosing rate 0.7 ml/min) were started and added such that feed 2 was added 5 minutes before the addition of feed 1 was completed. The addition of feed 3 was completed approximately 10 minutes after the completion of feed 1. Thereafter, the reaction mixture was postpolymerized at 100° C. (approx. 30 minutes) until peroxide could no longer be detected. After cooling down to 50° C., a clear polymer solution with a solids content of 41%, a viscosity of 600 cps and a molecular weight Mw=5000 was obtained. Control: peroxide test with Merckoquant 1.10011 test strips.
Polycarboxylic Acid 2: Polymethacrylic Acid
Formulation 2:

| Receiving flask: | 350 g of dist. water |
|---|---|
| Feed 1 | 860 g (10 mol) of methacrylic acid |
|  | 750 g of dist. water |
| Feed 2 | 90 g of Na hypophosphite monohydrate (9 g/mol MAS) |
|  | 210 g of dist. water |
| Feed 3 | 25 g of Na peroxodisulfate (2.5 g/mol AS) |
|  | 135 g of dist. water |

In a 3-liter, four-necked round-bottom flask provided with a thermometer, an anchor stirrer with a coolable stirrer seal, a 40 cm ball condenser, and a coolable inlet tube for feeds from automatic dosing devices, 300 g of water was heated to reflux. Then, 13.6 ml of the Na hypophosphite solution (inlet 2) was quickly added and 13.6 ml (inlet 3) was quickly added. Then, while boiling and stirring, feed 1 was added with a dosing rate of 6 ml/min during 180 minutes. At the same time, feed 2 (dosing rate 0.8 ml/min) and feed 3 (dosing rate 0.7 ml/min) were started and added such that feed 2 was added 5 minutes before the addition of feed 1 was completed. The addition of feed 3 was completed approximately 10 minutes after the completion of feed 1. Thereafter, the reaction mixture was postpolymerized at 100° C. (approx. 30 minutes) until peroxide could no longer be detected. After cooling down to 50° C., a clear polymer solution with a solids content of 41%, a viscosity of 1500 cps and a molecular weight Mw=6500 was obtained. Control: peroxide test with Merckoquant 1.10011 test strips.
Polycarboxylic Acid 3: Poly(acrylic acid-co-methacrylic acid)(50:50 mol %)
Formulation 3:

| Receiving flask: | 340 g of dist. water |
|---|---|
| Feed 1 | 360 g (5 mol) of acrylic acid |
|  | 430 g (5 mol) of methacrylic acid |
|  | 340 g of dist. water |
| Feed 2 | 40 g of Na hypophosphite monohydrate (4 g/mol AS/MAS) |
|  | 90 g of dist. water |
| Feed 3 | 20 g of Na peroxodisulfate (2 g/mol AS/MAS) |
|  | 66 g of dist. water |

In a 3-liter, four-necked round-bottom flask provided with a thermometer, an anchor stirrer with a coolable stirrer seal, a 40 cm ball condenser, and a coolable inlet tube for feeds from automatic dosing devices, 340 g of water was heated to reflux. Then, 9.4 ml of the Na hypophosphite solution (inlet 2) was quickly added and 9.4 ml (inlet 3) was quickly added. Then, while boiling and stirring, feed 1 was added with a dosing rate of 6 ml/min during 180 minutes. At the same time, feed 2 (dosing rate 0.8 ml/min) and feed 3 (dosing rate 0.7 ml/min) were started and added such that feed 2 was added 5 minutes before the addition of feed 1 was completed. The addition of feed 3 was completed approximately 10 minutes after the completion of feed 1. Thereafter, the reaction mixture was postpolymerized at 100° C. (approx. 30 minutes) until peroxide could no longer be detected. After cooling down to 50° C., a clear polymer solution with a solids content of 50%, a viscosity of 2000 cps and a molecular weight Mw=5000 was obtained. Control: peroxide test with Merckoquant 1.10011 test strips.

Polycarboxylic Acid 4: Poly(acrylic acid-co-methacrylic acid; 60:40 mol %)
Formulation 4:

| Receiving flask: | 330 g of dist. water |
|---|---|
| Feed 1 | 432 g (6 mol) of acrylic acid |
|  | 344 g (4 mol) of methacrylic acid |
| Feed 2 | 40 g of Na hypophosphite monohydrate (4 g/mol AS/MAS) |
|  | 90 g of dist. water |
| Feed 3 | 20 g of Na peroxodisulfate (2 g/mol AS/MAS) |
|  | 72 g of dist. water |

In a 3-liter, four-necked round-bottom flask provided with a thermometer, an anchor stirrer with a coolable stirrer seal, a 40 cm ball condenser, and a coolable inlet tube for feeds from automatic dosing devices, 330 g of water was heated to reflux. Then, 9.4 ml of the Na hypophosphite solution (inlet 2) was quickly added and 9.4 ml (inlet 3) was quickly added. Then, while boiling and stirring, feed 1 was added with a dosing rate of 6 ml/min during 180 minutes. At the same time, feed 2 (dosing rate 0.8 ml/min) and feed 3 (dosing rate 0.7 ml/min) were started and added such that feed 2 was added 5 minutes before the addition of feed 1 was completed. The addition of feed 3 was completed approximately 10 minutes after the completion of feed 1. Thereafter, the reaction mixture was postpolymerized at 100° C. (approx. 30 minutes) until peroxide could no longer be detected. After cooling down to 50° C., a clear polymer solution with a solids content of 51%, a viscosity of 1500 cps and a molecular weight Mw=4800 was obtained.
Polycarboxylic Acid 5: Poly(acrylic acid-co-methacrylic acid)(40:60 mol %)
Formulation 5:

| Receiving flask | 330 g of dist. water |
|---|---|
| Feed 1 | 288 g (4 mol) of acrylic acid |
|  | 516 g (6 mol) of methacrylic acid |
|  | 330 g of dist. water |
| Feed 2 | 40 g of Na hypophosphite monohydrate (4 g/mol AS/MAS) |
|  | 90 g of dist. water |
| Feed 3 | 23 g of Na peroxodisulfate (2 g/mol AS/MAS) |
|  | 72 g of dist. water |

In a 3-liter, four-necked round-bottom flask provided with a thermometer, an anchor stirrer with a coolable stirrer seal, a 40 cm ball condenser, and a coolable inlet tube for feeds from automatic dosing devices, 330 g of water was heated to reflux. Then, 9.4 ml of the Na hypophosphite solution (inlet 2) was quickly added and 9.4 ml (inlet 3) was quickly added. Then, while boiling and stirring, feed 1 was added with a dosing rate of 6 ml/min during 180 minutes. At the same time, feed 2 (dosing rate 0.8 ml/min) and feed 3 (dosing rate 0.7 ml/min) were started and added such that feed 2 was added 5 minutes before the addition of feed 1 was completed. The addition of feed 3 was completed approximately 10 minutes after the completion of feed 1. Thereafter, the reaction mixture was postpolymerized at 100° C. (approx. 30 minutes) until peroxide could no longer be detected. After cooling down to 50° C., a clear polymer solution with a solids content of 52%, a viscosity of 2500 cps and a molecular weight Mw=5800 was obtained.

3.2. Preparation of Copolymers by Polymer-Analogous Partial Esterification of Polycarboxylic Acids with Monoalkyl Polyalkylene Polyols Comb Polymer P-1

170 g of polycarboxylic acid 3 (corresponds to approx. 1 mol of carboxylic groups) was added to a 2-liter, four-necked round-bottom flask provided with a mechanical stirrer (IKA® overhead stirrer), a thermometer, a gas inlet tube and a distillation bridge. The receiving flask was heated to 50° C., and subsequently 270 g of MPEG 1000 and 0.1 g of Foamex 144 were added. The reaction mixture was heated to 170° C. under a $N_2$ stream. The water contained in the mixture and the reaction water were continuously distilled off under a $N_2$ stream. When the temperature was reached, 2 g of a 50% NaOH solution and 2.5 g of Jeffamin M 2070 were added to the reaction mixture and a vacuum of 80 mbar was applied. A complete conversion was achieved after 2½ hours. The polymer melt was allowed to solidify or, after cooling down to <100° C., adjusted to a solids content of 30% with water. A clear polymer solution was obtained. The conversion to polymer determined by GPC was 99%. Molecular weight Mn=11000.

Comb Polymer P-2

170 g of polycarboxylic acid 3 (corresponds to approx. 1 mol of carboxylic groups) was added to a 2-liter, four-necked round-bottom flask provided with a mechanical stirrer (IKA® overhead stirrer), a thermometer, a gas inlet tube and a distillation bridge. The receiving flask was heated to 50° C., and subsequently 200 g of MPEG 1000, 220 g or MPEG 3000, and 0.1 g of Foamex 144 were added. The reaction mixture was heated to 170° C. under a $N_2$ stream. The water contained in the mixture and the reaction water were continuously distilled off under a $N_2$ stream. When the temperature was reached, 2 g of a 50% NaOH solution and 2.5 g of Jeffamin M 2070 were added to the reaction mixture and a vacuum of 80 mbar was applied. A complete conversion was achieved after 2½ hours. The polymer melt was allowed to solidify or, after cooling down to <100° C., adjusted to a solids content of 30% with water. A clear polymer solution was obtained. The conversion to polymer determined by GPC was 98.6%. Molecular weight Mn=11000

Comb Polymer P-3

166 g of polycarboxylic acid 4 (corresponds to approx. 1 mol of carboxylic groups) was added to a 2-liter, four-necked round-bottom flask provided with a mechanical stirrer (IKA® overhead stirrer), a thermometer, a gas inlet tube and a distillation bridge. The receiving flask was heated to 50° C., and subsequently 140 g of MPEG 1000, 280 g of MPEH 3000 and 0.1 g of Foamex 144 were added. The reaction mixture was heated to 170° C. under a $N_2$ stream. The water contained in the mixture and the reaction water were continuously distilled off under a $N_2$ stream. When the temperature was reached, 2 g of a 50% NaOH solution and 2.5 g of Jeffamin M 2070 were added to the reaction mixture and a vacuum of 80 mbar was applied. A complete conversion was achieved after 2½ hours. The polymer melt was allowed to solidify or, after cooling down to <100° C., adjusted to a solids content of 30% with water. A clear polymer solution was obtained. The conversion to polymer determined by GPC was 99.1%. Molecular weight Mn=10700.

Comb Polymer P-4

170 g of polycarboxylic acid 4 (corresponds to approx. 1 mol of carboxylic groups) was added to a 2-liter, four-necked round-bottom flask provided with a mechanical stirrer (IKA® overhead stirrer), a thermometer, a gas inlet tube and a distillation bridge. The receiving flask was heated to 50° C., and subsequently 200 g of MPEG 1000, 220 g or MPEG 3000, and 0.1 g of Foamex 144 were added. The reaction mixture was heated to 170° C. under a $N_2$ stream. The water contained in the mixture and the reaction water were continuously distilled off under a $N_2$ stream. When the temperature was reached, 2 g of a 50% NaOH solution and 2.5 g of Jeffamin M 2070 were added to the reaction mixture and a vacuum of 80 mbar was applied. A complete conversion was achieved after 2½ hours. The polymer melt was allowed to solidify or, after cooling down to <100° C., adjusted to a solids content of 30% with water. A clear polymer solution was obtained. The conversion to polymer determined by GPC was 99%. Molecular weight Mn=10100.

Comb Polymer P-5

170 g of polycarboxylic acid 5 (corresponds to approx. 1 mol of carboxylic groups) was added to a 2-liter, four-necked round-bottom flask provided with a mechanical stirrer (IKA® overhead stirrer), a thermometer, a gas inlet tube and a distillation bridge. The receiving flask was heated to 50° C., and subsequently 270 g of MPEG 1000 and 0.1 g of Foamex 144 were added. The reaction mixture was heated to 170° C. under a $N_2$ stream. The water contained in the mixture and the reaction water were continuously distilled off under a $N_2$ stream. When the temperature was reached, 2 g of a 50% NaOH solution and 2.5 g of Jeffamin M 2070 were added to the reaction mixture and a vacuum of 80 mbar was applied. A complete conversion was achieved after 2½ hours. The polymer melt was allowed to solidify or, after cooling down to <100° C., adjusted to a solids content of 30% with water. A clear polymer solution was obtained. The conversion to polymer determined by GPC was 97. Molecular weight Mn=10100

Comb Polymer P-6

170 g of polycarboxylic acid 5 (corresponds to approx. 1 mol of carboxylic groups) was added to a 2-liter, four-necked round-bottom flask provided with a mechanical stirrer (IKA® overhead stirrer), a thermometer, a gas inlet tube and a distillation bridge. The receiving flask was heated to 50° C., and subsequently 200 g of MPEG 1000, 220 g or MPEG 3000, and 0.1 g of Foamex 144 were added. The reaction mixture was heated to 170° C. under a $N_2$ stream. The water contained in the mixture and the reaction water were continuously distilled off under a $N_2$ stream. When the temperature was reached, 2 g of a 50% NaOH solution and 2.5 g of Jeffamin M 2070 were added to the reaction mixture and a vacuum of 80 mbar was applied. A complete conversion was achieved after 2½ hours. The polymer melt was allowed to solidify or, after cooling down to <100° C., adjusted to a solids content of 30% with water. A clear polymer solution was obtained. The conversion to polymer determined by GPC was 99%. Molecular weight Mn=11000

Comb Polymer P-7

170 g of polycarboxylic acid 3 (corresponds to approx. 1 mol of carboxylic groups) was added to a 2-liter, four-necked round-bottom flask provided with a mechanical stirrer (IKA® overhead stirrer), a thermometer, a gas inlet tube and a distillation bridge. The receiving flask was heated to 50° C., and subsequently 340 g of MPEG 1000 and 0.1 g of Foamex 144 were added. The reaction mixture was heated to 170° C. under a $N_2$ stream. The water contained in the mixture and the reaction water were continuously distilled off under a $N_2$ stream. When the temperature was reached, 2 g of a 50% NaOH solution and 2.5 g of Jeffamin M 2070 were added to the reaction mixture and a vacuum of 80 mbar was applied. A complete conversion was achieved after 2½ hours. The polymer melt was allowed to solidify or, after cooling down to <100° C., adjusted to a solids content of 30% with water. A clear polymer solution was obtained. The conversion to polymer determined by GPC was 99%. Molecular weight Mn=11300.

Comparative Polymer V-1

154 g of polycarboxylic acid 1 (corresponds to approx. 1 mol of carboxylic groups) was added to a 2-liter, four-necked round-bottom flask provided with a mechanical stirrer (IKA® overhead stirrer), a thermometer, a gas inlet tube and a distillation bridge. The receiving flask was heated to 50° C., and subsequently 340 g of MPEG 1000 and 0.1 g of Foamex 144 were added. The reaction mixture was heated to 170° C. under a $N_2$ stream. The water contained in the mixture and the reaction water were continuously distilled off under a $N_2$ stream. When the temperature was reached, 2 g of a 50% NaOH solution and 2.5 g of Jeffamin M 2070 were added to the reaction mixture and a vacuum of 80 mbar was applied. A complete conversion was achieved after 2½ hours. The polymer melt was allowed to solidify or, after cooling down to <100° C., adjusted to a solids content of 30% with water. A clear polymer solution was obtained. The conversion to polymer determined by GPC was 97%. Molecular weight Mn=10900

Comparative Polymer V-2

242 g of polycarboxylic acid 1 (corresponds to approx. 1 mol of carboxylic groups) was added to a 2-liter, four-necked round-bottom flask provided with a mechanical stirrer (IKA® overhead stirrer), a thermometer, a gas inlet tube and a distillation bridge. The receiving flask was heated to 50° C., and subsequently 340 g of MPEG 1000 and 0.1 g of Foamex 144 were added. The reaction mixture was heated to 170° C. under a $N_2$ stream. The water contained in the mixture and the reaction water were continuously distilled off under a $N_2$ stream. When the temperature was reached, 2 g of a 50% NaOH solution and 2.5 g of Jeffamin M 2070 were added to the reaction mixture and a vacuum of 80 mbar was applied. A complete conversion was achieved after 2½ hours. The polymer melt was allowed to solidify or, after cooling down to <100° C., adjusted to a solids content of 30% with water. A clear polymer solution was obtained. The conversion to polymer determined by GPC was 98.9%. Molecular weight Mn=11200.

Comparative Polymer V-3

188 g (1 mol) of comparative polymer V-1 and 276 g (1 mol) of comparative polymer V-2 were mixed with vigorous stirring. A clear solution was formed. Molecular weight Mn=11000

3.3. Preparation of Comb Polymers by Free-Radical Polymerization

Preparation of Ester 1

Azeotropic partial esterification of a mixture of acrylic acid and methacrylic acid in a molar ratio or 1:1 with MPEG 1000.

1000 g of MPEG 1000, 133.2 g of acrylic acid (1.85 mol), 159.1 g (1.85 mol) of methacrylic acid, 13.5 g of p-toluene sulfonic acid monohydrate, 0.5 g of phenothiazine, and 250 g of toluene were added to a 3-liter glass reactor provided with a water separator and a gas inlet tube. Subsequently the flask was heated to 130° C. while passing nitrogen through and refluxed for 6.5 hours. The formed reaction water was separated off in the water separator and the discharged toluene is returned to the reactor. The acid value of the reaction mixture was 95.2 mg KOH/g. The conversion to methyl polyethylene glycol determined by GPC was 94.7%.

Preparation of Ester 2

Azeotropic partial esterification of a mixture of acrylic acid and methacrylic acid in a molar ratio or 1:1 with MPEG 1000 and MPEG 3000.

740 g of MPEG 1000, 814 g of MPEG 3000, 133.2 g of acrylic acid (1.85 mol), 159.1 g (1.85 mol) of methacrylic acid, 13.5 g of p-toluene sulfonic acid monohydrate, 0.5 g of phenothiazine, and 250 g of toluene were added to a 3-liter glass reactor provided with a water separator and a gas inlet tube. Subsequently the flask was heated to 130° C. while passing nitrogen through and refluxed for 7 hours. The formed reaction water was separated off in the water separator and the discharged toluene is returned to the reactor. The acid value of the reaction mixture was 96 mg KOH/g. The conversion to methyl polyethylene glycol determined by GPC was 93.8%.

Comparative Polymer V-4

| | |
|---|---|
| Receiving flask: | 800 g of dist. water |
| Feed 1 | 700 g of ester 1 |
| Feed 2 | 6 g of Na hypophosphite monohydrate |
| | 100 g of dist. water |
| Feed 3 | 8.8 g of Na peroxodisulfate |
| | 100 g of dist. water |

In a 3-liter reactor provided with automatic dosing devices, a water separator and a gas inlet tube with a reflux condenser, 800 g of water were heated to the boiling point while passing nitrogen through and at the same time feeds 1, 2, and 3 were added within 5 hours while keeping the reflux. Small amounts of the toluene contained in feed 1 were separated in the water separator and the water separated at the same time was returned into the reactor. After completion of the feed additions, the reaction mixture was postpolymerized for additional 2 hours and cooled to 50° C. The obtained clear solution with a solids content of 38.9% was diluted to 30% by adding water. The polymer contents determined by GPC was approx. 98%. Molecular weight $M_n$=10200.

Comparative Polymer V-5

| | |
|---|---|
| Receiving flask | 800 g of dist. water |
| Feed 1 | 998 g of ester 2 |
| Feed 2 | 6 g of Na hypophosphite monohydrate |
| | 100 g of dist. water |
| Feed 3 | 8.8 g of Na peroxodisulfate |
| | 100 g of dist. water |

In a 3-liter reactor provided with automatic dosing devices, a water separator and a gas inlet tube with a reflux condenser, 800 g of water were heated to the boiling point while passing nitrogen through and at the same time feeds 1, 2, and 3 were added within 6 hours while keeping the reflux. Small amounts of the toluene contained in feed 1 were separated off in the water separator and the water separated off at the same time was returned into the reactor. After completion of the feed additions, the reaction mixture was postpolymerized for additional 2 hours and cooled to 50° C. The obtained clear solution with a solids content of 41% was diluted to 30% by adding water. The polymer contents determined by GPC was approx. 97%. Molecular weight $M_n$=10700.

Comparative Polymer V-6

Mighty 150 (KAO Corp. Tokyo)

Sodium salt of a sulfonated naphthalene-formaldehyde polycondensate with a molecular weight of 5000-6000 g/mol 4. Preparation of Cement Mortars Evaluation and comparison of the processing properties of cement mortars containing the copolymers according to the disclosure and comparative polymers.

Mortar Tests

The efficiency of the polymers according to the disclosure was tested using a mortar.

The mortar had the following composition (Table 2)

TABLE 2

| Composition of the mortar mixture (MM): (maximum particle size 8 mm) | Amount |
|---|---|
| Cement (Swiss CEM I 42.5) | 750 g |
| Limestone filler | 141 g |
| Sand 0-1 mm | 738 g |
| Sand 1-4 mm | 1107 g |
| Sand 4-8 mm | 1154 g |

The sands, the filler and the cement were dry-mixed in a Hobart mixer for 1 minute. The mixing water containing the comb polymer was added within 30 seconds. After the addition of the mixing water, mixing was continued for 2.5 min. The comb polymer amount based on the cement is indicated in Table 3. The comb polymers were used as 30% aqueous dispersions. The 30% aqueous solution additionally contains 0.1% by weight of a defoamer. The total wet mixing time was 3 minutes. The water/cement ratio (W/C ratio) was 0.42. The slump-flow value of the mortar was determined according to EN 1015-3. The results are summarized in table 3.

TABLE 3

| No. | Additive | W/C | % by weight based on cement | ABM (mm) 0 min | 30 min | 60 min | 90 min | ΔABM in % after 90 min |
|---|---|---|---|---|---|---|---|---|
| M-1 | P-1 | 0.42 | 0.24 | 200 | 200 | 198 | 195 | 2.5 |
| M-2 | P-2 | 0.42 | 0.24 | 213 | 218 | 223 | 218 | −2.4 |
| M-3 | P-3 | 0.42 | 0.24 | 208 | 204 | 201 | 197 | 3.3 |
| M-4 | P-4 | 0.42 | 0.24 | 202 | 220 | 225 | 212 | −5 |
| M-5 | P-5 | 0.42 | 0.24 | 211 | 213 | 210 | 209 | 1 |
| M-6 | P-6 | 0.42 | 0.24 | 210 | 215 | 207 | 205 | 2.4 |
| M-7 | P-7 | 0.42 | 0.24 | 218 | 216 | 213 | 212 | 2.8 |
| VM-1 | V-1 | 0.42 | 0.24 | 222 | 224 | 210 | 172 | 22.5 |
| VM-2 | V-2 | 0.42 | 0.24 | 208 | 186 | 180 | 180 | 13.5 |
| VM-3 | V-3 | 0.42 | 0.24 | 212 | 191 | 180 | 174 | 18 |
| VM-4 | V-4 | 0.42 | 0.24 | 204 | 202 | 162 | 138 | 25 |
| VM-5 | V-5 | 0.42 | 0.24 | 215 | 204 | 176 | 153 | 19.8 |
| VM-6 | V-6 | 0.42 | 0.48 | 220 | 190 | 158 | — | — |

The slump-flow values (ABM) illustrated in Table 3, measured in mm, were measured after 0, 30, 60, and 90 minutes, respectively. The additive additions are given in % by weight of solids of the comb polymer P-1 to P-7 and the comparative polymers V-1 to V-6, based on the cement weight of the test mortars.

The results illustrated in Table 3 show that the polymers pursuant to the disclosure P-1 to P-7 have excellent plasticizing properties over longer periods, compared to the comparative polymers V-1 to V-6. Thus, 90 minutes after the preparation thereof, the mixtures M-1 to M-7 according to the disclosure show a very small decrease of the slump-flow value of at most approximately 3%, whereas a strong decrease of 13.5-25% is measured for all comparative mortars VM-1 to VM-6. Surprisingly, the slump-flow value of mixtures M-2 and M-4 even increased by 2.4% and 5%, respectively. Surprisingly, the effect was significantly greater in the comb polymers P-1 and P-2 prepared by an polymer-analogous esterification than in the polymers V-4 and V-5 prepared by free-radical polymerization of the monomer methyl polyglycol esters of acrylic and methacrylic acids with methacrylic acid and acrylic acid. The proportion of side chains and monomers illustrated in Table 3 shows that the comb polymers prepared in different ways are directly comparable. The comparative mixtures VM-4 and VM-5 show a high initial slump-flow value, but a high decrease by 25% and 19.8%, respectively, after 90 minutes. Contrary, the mixtures M-1 and M-2 which contain the comb polymers P-1 and P-2 with the same stoichiometric compositions as V-4 and V-5, show a nearly constant processing over the complete period of 90 minutes.

The commercial product Mighty 150 was used as reference polymer V-6. The results for the comparative mixture VM-6 show that twice the amount of this polymer was used to achieve a comparable slump-flow value of greater than 200 mm. However, the mortar begins to stiffen much faster, so that a slump-flow value cannot be measured after 90 minutes. Moreover, it is noted that the mortar containing this high amount tends to segregate (so-called "bleeding") which is not the case in the mixtures according to the disclosure.

Hence, it can be shown that according to exemplary embodiments, the use of comb polymers prepared by a polymer-analogous reaction allows to obtain an excellent plastification and, moreover, a prolonged processing.

It will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

What is claimed is:

1. A comb polymer for improving the processing of a hydraulically setting composition, comprising:
    side chains bound to a main chain via ester, amide and/or ether groups, wherein the main chain includes at least one acrylic acid unit A or a salt thereof and at least one methacrylic acid unit M or a salt thereof,
    wherein the comb polymer comprises from 30 to 70 mol % of the at least one acrylic acid unit A, and from 30 to 70 mol % of the at least one methacrylic acid unit M, based in each case on the total number of all monomer units in the main chain of the comb polymer,
    wherein the comb polymer is prepared by an esterification and/or amidation of a polycarboxylic acid or a salt or an anhydride thereof,
    wherein the comb polymer comprises at least one structural unit B of the formula (I):

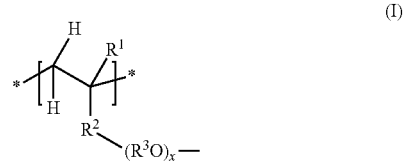

wherein $R^1$, independently of one another, is H or $CH_3$;
$R^2$, independently of one another, is an ester group —CO—O— or an amide group —CO—NH—;

R³, independently of one another, is a $C_2$-$C_6$ alkylene group,

R⁴, independently of one another, is H, a $C_1$-$C_{12}$ alkyl or cycloalkyl moiety, a $C_7$-$C_{20}$ alkylaryl or aralkyl moiety or a substituted or unsubstituted aryl moiety or a univalent organic moiety having from 1 to 30 C atoms which optionally has hetero atoms, and x, independently of one another, is a value between 3 and 250, wherein the main chain of the comb polymer is a linear copolymer obtained from the at least one acrylic acid unit A or the salt or anhydride thereof and the methacrylic acid unit M or the salt or anhydride thereof by a polymerization, wherein the structural unit B is a component of this linear copolymer, wherein the comb polymer comprises from 10 to 40 mol % of the at least one structural unit B; and wherein the comb polymer comprises from 5 to 50% by weight of monomers having side chains bound to the main chain via ester, amide and/or ether groups, based in each case on the total number of all monomer units in the main chain of the comb polymer, wherein the comb polymer has a proportion of ethylene oxide units of at least 30 mol %, of the total number of all $(R^3O)_x$ units.

2. The comb polymer according to claim 1, wherein the comb polymer comprises at least one structural unit B of the formula (I) with R¹ equal to H and at least one structural unit B of the formula (I) with R¹ equal to CH₃.

3. The comb polymer according to claim 1, wherein the comb polymer comprises at least one additional structural unit C which differs from the structural units A, B, and M and which is an ether, ester, amide, or imide unit, an acid unit selected from carboxylic acid, sulfonic acid, phosphonic acid, phosphoric acid ester, carbonylamidomethylpropanesulfonic acid or salts thereof, or a polyoxyalkyleneoxycarbonyl, polyoxyalkyleneaminocarbonyl, polyoxyalkyleneoxyalkyl, polyoxyalkyleneoxy, hydroxyethyloxycarbonyl, acetoxy, phenyl, or N-pyrrolidonyl group.

4. The comb polymer according to claim 1, wherein the comb polymer comprises from 0 to 30 mol % of at least one structural unit C, wherein the structural unit C differs from the structural units A, B, and M and is an ether, ester, amide, or imide unit, an acid unit selected from carboxylic acid, sulfonic acid, phosphonic acid, phosphoric acid ester, carbonylamidomethylpropanesulfonic acid or salts thereof, or a polyoxyalkyleneoxycarbonyl, polyoxyalkyleneaminocarbonyl, polyoxyalkyleneoxyalkyl, polyoxyalkyleneoxy, hydroxyethyloxycarbonyl, acetoxy, phenyl, or N-pyrrolidonyl group, based in each case on the total number of all monomer units in the main chain of the comb polymer.

5. The comb polymer according to claim 1, wherein the esterification and/or amidation occurs by the reaction of:

a) at least one polycarboxylic acid comprising at least one acrylic acid unit A and at least one methacrylic acid unit M, or a salt or anhydride of this polycarboxylic acid; and b) at least one compound selected from the group consisting of a monohydroxy compound E of the formula (II)

and a monoamine compound F of the formula (III)

wherein R³, R⁴, and x are selected independently of one another as mentioned above.

6. The comb polymer according to claim 1, wherein the hydraulic binder includes a cement, plaster, caustic lime, or a mixture of cement with fly ash, a mixture of cement with silica fume, a mixture of cement with slag, a mixture of cement with slag sand, or a mixture of cement with limestone filler.

7. The comb polymer according to claim 1, wherein the slump-flow value of the hydraulically setting composition measured according to EN 1015-3 does not decrease by more than 5% during at least 60 minutes.

8. A method for producing a hydraulically setting composition, the method comprising:

mixing a hydraulically setting binder, water, and the comb polymer according to claim 1.

9. A method of using the comb polymer according to claim 1, the method comprising:

adding at least a portion of the comb polymer that is employed in the method, to at least one component of a hydraulically setting composition before and/or during a grinding process.

10. The method according to claim 9, wherein the comb polymer is added before and/or during a grinding process of cement raw materials, cement clinker, cement and/or cement additives.

11. A method of using the comb polymer according to claim 1, the method comprising:

conducting a grinding process using the comb polymer as a grinding aid for improving grinding efficiency.

12. The comb polymer according to claim 1, wherein in the formula (I), R³, independently of one another, is an ethylene or propylene group.

13. The comb polymer according to claim 1, wherein the comb polymer has a proportion of ethylene oxide units of from 50 to 100 mol %, of the total number of all $(R^3O)_x$ units.

14. The comb polymer according to claim 1, wherein the comb polymer comprises from 0 to 15 mol % of at least one structural unit C, wherein the structural unit C differs from the structural units A, B, and M and is an ether, ester, amide, or imide unit, an acid unit selected from carboxylic acid, sulfonic acid, phosphonic acid, phosphoric acid ester, carbonylamidomethylpropanesulfonic acid or salts thereof, or a polyoxyalkyleneoxycarbonyl, polyoxyalkyleneaminocarbonyl, polyoxyalkyleneoxyalkyl, polyoxyalkyleneoxy, hydroxyethyloxycarbonyl, acetoxy, phenyl, or N-pyrrolidonyl group, based in each case on the total number of all monomer units in the main chain of the comb polymer.

15. The comb polymer according to claim 1, wherein the comb polymer comprises:

from 40 to 60 mol % of the at least one acrylic acid unit A, from 40 to 60 mol % of the at least one methacrylic acid unit M, from 10 to 40 mol % of the at least one structural unit B, and from 0 to 15 mol % of at least one structural unit C, wherein the structural unit C differs from the structural units A, B, and M and is an ether, ester, amide, or imide unit, an acid unit selected from carboxylic acid, sulfonic acid, phosphonic acid, phosphoric acid ester, carbonylamidomethylpropanesulfonic acid or salts thereof, or a polyoxyalkyleneoxycarbonyl, polyoxyalkyleneaminocarbonyl, polyoxyalkyleneoxyalkyl, polyoxyalkyleneoxy, hydroxyethyloxycarbonyl, acetoxy, phenyl, or N-pyrrolidonyl group, based in each case on the total number of all monomer units in the main chain of the comb polymer.

16. The comb polymer according to claim 1, wherein the slump-flow value of the hydraulically setting composition measured according to EN 1015-3 does not decrease by more than 5% during at least 90 minutes.

17. A method of using the comb polymer according to claim 1, the method comprising:
adding an entire amount of the comb polymer that is employed in the method, to at least one component of a hydraulically setting composition before and/or during a grinding process.

18. The comb polymer according to claim 1, wherein the comb polymer comprises at least one structural unit B of the formula (I):

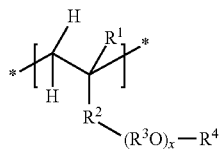
(I)

wherein
$R^1$, independently of one another, is H or $CH_3$;
$R^2$, independently of one another, is an ester group —CO—O— or an amide group —CO—NH—;
$R^3$, independently of one another, is a $C_2$-$C_6$ alkylene group,
$R^4$, independently of one another, is H, a $C_1$-$C_{12}$ alkyl or cycloalkyl moiety, a $C_7$-$C_{20}$ alkylaryl or aralkyl moiety or a substituted or unsubstituted aryl moiety or a univalent organic moiety having from 1 to 30 C atoms which optionally has hetero atoms, and
x, independently of one another, is a value between 3 and 250,
wherein the main chain of the comb polymer is a linear copolymer obtained from the at least one acrylic acid unit A or the salt or anhydride thereof and the methacrylic acid unit M or the salt or anhydride thereof by a polymerization,
wherein the structural unit B is a component of this linear copolymer;
wherein the comb polymer has a proportion of ethylene oxide units of at least 30 mol %, of the total number of all $(R^3O)_x$ units; and
wherein the comb polymer comprises:
from 30 to 70 mol % of the at least one acrylic acid unit A,
from 30 to 70 mol % of the at least one methacrylic acid unit M, and
from 0 to 30 mol % of at least one structural unit C, wherein the structural unit C differs from the structural units A, B, and M and is an ether, ester, amide, or imide unit, an acid unit selected from carboxylic acid, sulfonic acid, phosphonic acid, phosphoric acid ester, carbonylamidomethylpropanesulfonic acid or salts thereof, or a polyoxyalkyleneoxycarbonyl, polyoxyalkyleneaminocarbonyl, polyoxyalkyleneoxyalkyl, polyoxyalkyleneoxy, hydroxyethyloxycarbonyl, acetoxy, phenyl, or N-pyrrolidonyl group,
based in each case on the total number of all monomer units in the main chain of the comb polymer.

19. The comb polymer according to claim 1, wherein the comb polymer comprises at least one structural unit B of the formula (I):

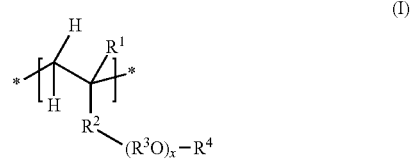
(I)

wherein
$R^1$, independently of one another, is H or $CH_3$;
$R^2$, independently of one another, is an ester group —CO—O— or an amide group —CO—NH—;
$R^3$, independently of one another, is a $C_2$-$C_6$ alkylene group,
$R^4$, independently of one another, is H, a $C_1$-$C_{12}$ alkyl or cycloalkyl moiety, a $C_7$-$C_{20}$ alkylaryl or aralkyl moiety or a substituted or unsubstituted aryl moiety or a univalent organic moiety having from 1 to 30 C atoms which optionally has hetero atoms, and
x, independently of one another, is a value between 3 and 250,
wherein the main chain of the comb polymer is a linear copolymer obtained from the at least one acrylic acid unit A or the salt or anhydride thereof and the methacrylic acid unit M or the salt or anhydride thereof by a polymerization,
wherein the structural unit B is a component of this linear copolymer;
wherein the comb polymer has a proportion of ethylene oxide units of at least 30 mol %, of the total number of all $(R^3O)_x$ units; and
wherein the comb polymer comprises:
from 40 to 60 mol % of the at least one acrylic acid unit A,
from 40 to 60 mol % of the at least one methacrylic acid unit M,
from 10 to 40 mol % of the at least one structural unit B, and
from 0 to 15 mol % of at least one structural unit C, wherein the structural unit C differs from the structural units A, B, and M and is an ether, ester, amide, or imide unit, an acid unit selected from carboxylic acid, sulfonic acid, phosphonic acid, phosphoric acid ester, carbonylamidomethylpropanesulfonic acid or salts thereof, or a polyoxyalkyleneoxycarbonyl, polyoxyalkyleneaminocarbonyl, polyoxyalkyleneoxyalkyl, polyoxyalkyleneoxy, hydroxyethyloxycarbonyl, acetoxy, phenyl, or N-pyrrolidonyl group,
based in each case on the total number of all monomer units in the main chain of the comb polymer.

20. The comb polymer according to claim 19, wherein the comb polymer comprises at least one structural unit B of the formula (I) with $R^1$ equal to H and at least one structural unit B of the formula (I) with $R^1$ equal to $CH_3$.

21. The comb polymer according to claim 1, wherein the comb polymer has an average molecular weight $M_n$ ranging from 5000 to 50,000 g/mol.

22. A comb polymer for improving the processing of a hydraulically setting composition, comprising:
side chains bound to a main chain via ester, amide and/or ether groups, wherein the main chain includes at least one acrylic acid unit A or a salt thereof and at least one methacrylic acid unit M or a salt thereof, wherein the comb polymer comprises from 30 to 70 mol % of the at least one acrylic acid unit A, and from 30 to 70 mol % of the at least one methacrylic acid unit M, based in each case on the total number of all monomer units in the main chain of the comb polymer, wherein the comb polymer is prepared by an esterification and/or amidation of a polycarboxylic acid or a salt or an anhydride thereof, wherein the comb polymer comprises at least one structural unit B of the formula (I);

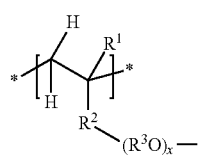
(I)

wherein $R^1$, independently of one another, is H or $CH_3$;

$R^2$, independently of one another, is an ester group —CO—O— or an amide group —CO—NH—;

$R^3$, independently of one another, is a $C_2$-$C_6$ alkylene group, $R^4$, independently of one another, is H, a $C_1$-$C_{12}$ alkyl or cycloalkyl moiety, a $C_7$-$C_{20}$ alkylaryl or aralkyl moiety or a substituted or unsubstituted aryl moiety or a univalent organic moiety having from 1 to 30 C atoms which optionally has hetero atoms, and x, independently of one another, is a value between 3 and 250, wherein the main chain of the comb polymer is a linear copolymer obtained from the at least one acrylic acid unit A or the salt or anhydride thereof and the methacrylic acid unit M or the salt or anhydride thereof by a polymerization, wherein the copolymer of acrylic acid unit A and methacrylic acid unit M is obtained by a free-radical polymerization in the presence of at least one molecular weight modifier wherein the molecular weight modifier is selected from the group consisting of a mercaptan compound and a phosphorus compound, wherein the structural unit B is a component of this linear copolymer, wherein the comb polymer comprises from 10 to 40 mol % of the at least one structural unit B; and wherein the comb polymer comprises from 5 to 50% by weight of monomers having side chains bound to the main chain via ester, amide and/or ether groups, based in each case on the total number of all monomer units in the main chain of the comb polymer, wherein the comb polymer has a proportion of ethylene oxide units of at least 30 mol %, of the total number of all $(R_3O)_x$ units.

23. The comb polymer according to claim 22, wherein the molecular weight modifier is the mercaptan compound.

24. The comb polymer according to claim 22, wherein the molecular weight modifier is the phosphorus compound.

25. The comb polymer according to claim 22, wherein the molecular weight modifier is sodium hypophosphite.

26. The comb polymer according to claim 22, wherein the molecular weight modifier is sodium hypophosphite monohydrate.

27. The comb polymer according to claim 22, wherein the comb polymer comprises:
from 40 to 60 mol % of the at least one acrylic acid unit A,
from 40 to 60 mol % of the at least one methacrylic acid unit M,
from 10 to 40 mol % of the at least one structural unit B, and
from 0 to 15 mol % of at least one structural unit C, wherein the structural unit C differs from the structural units A, B, and M and is an ether, ester, amide, or imide unit, an acid unit selected from carboxylic acid, sulfonic acid, phosphonic acid, phosphoric acid ester, carbonylamidomethylpropanesulfonic acid or salts thereof, or a polyoxyalkyleneoxycarbonyl, polyoxyalkyleneaminocarbonyl, polyoxyalkyleneoxyalkyl, polyoxyalkyleneoxy, hydroxyethyloxycarbonyl, acetoxy, phenyl, or N-pyrrolidonyl group,
based in each case on the total number of all monomer units in the main chain of the comb polymer.

28. A method for producing a comb polymer for improving the processing of a hydraulically setting composition, the method comprising the steps of:
a) preparing a linear copolymer from at least one acrylic acid unit A or the salt or anhydride thereof and at least one methacrylic acid unit M or the salt or anhydride thereof by a polymerization;
b) binding side chains to the linear copolymer by an esterification and/or amidation of the linear copolymer and obtaining the comb polymer according to claim 1.

29. The method according to claim 28, wherein the linear copolymer prepared in step a) is obtained by a free-radical polymerization in the presence of at least one molecular weight modifier wherein the molecular weight modifier is selected from the group consisting of a mercaptan compound and a phosphorus compound.

30. The method according to claim 29, wherein the molecular weight modifier is the mercaptan compound.

31. The method according to claim 29, wherein the molecular weight modifier is the phosphorus compound.

32. The method according to claim 29, wherein the molecular weight modifier is sodium hypophosphite.

33. The method according to claim 29, wherein the molecular weight modifier is sodium hypophosphite monohydrate.

34. The method according to claim 29, wherein the comb polymer comprises:
from 40 to 60 mol % of the at least one acrylic acid unit A,
from 40 to 60 mol % of the at least one methacrylic acid unit M,
from 10 to 40 mol % of the at least one structural unit B,
from 0 to 15 mol % of at least one structural unit C, wherein the structural unit C differs from the structural units A, B, and M and is an ether, ester, amide, or imide unit, an acid unit selected from carboxylic acid, sulfonic acid, phosphonic acid, phosphoric acid ester, carbonylamidomethylpropanesulfonic acid or salts thereof, or a polyoxyalkyleneoxycarbonyl, polyoxyalkyleneaminocarbonyl, polyoxyalkyleneoxyalkyl, polyoxyalkyleneoxy, hydroxyethyloxycarbonyl, acetoxy, phenyl, or N-pyrrolidonyl group,
based in each case on the total number of all monomer units in the main chain of the comb polymer.

* * * * *